Dec. 8, 1925.
R. L. MORGAN
CORN HARVESTER
Filed Jan. 5, 1922
1,565,189
5 Sheets-Sheet 1
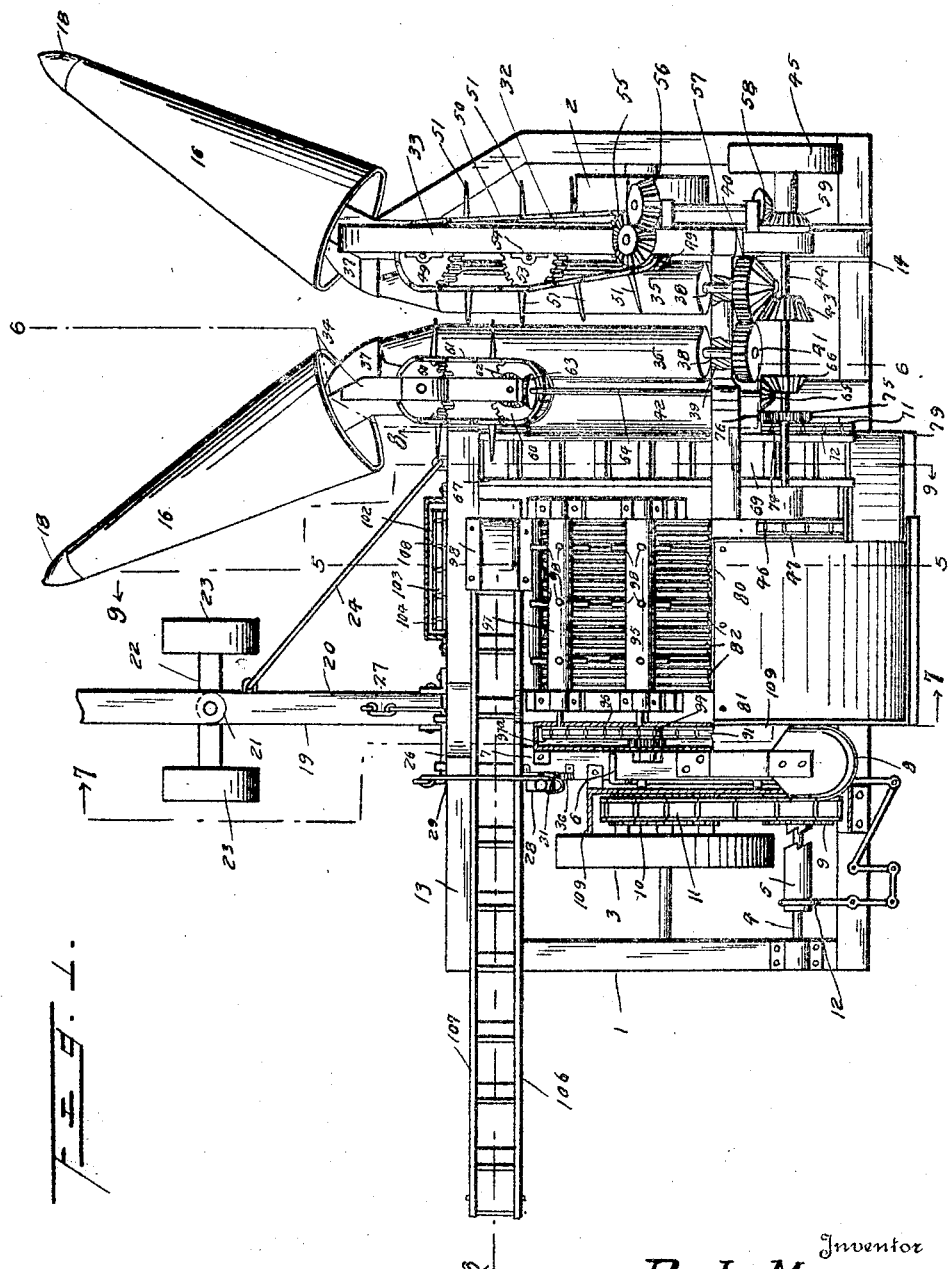
Inventor
R. L. Morgan.
By [signature]
Attorney

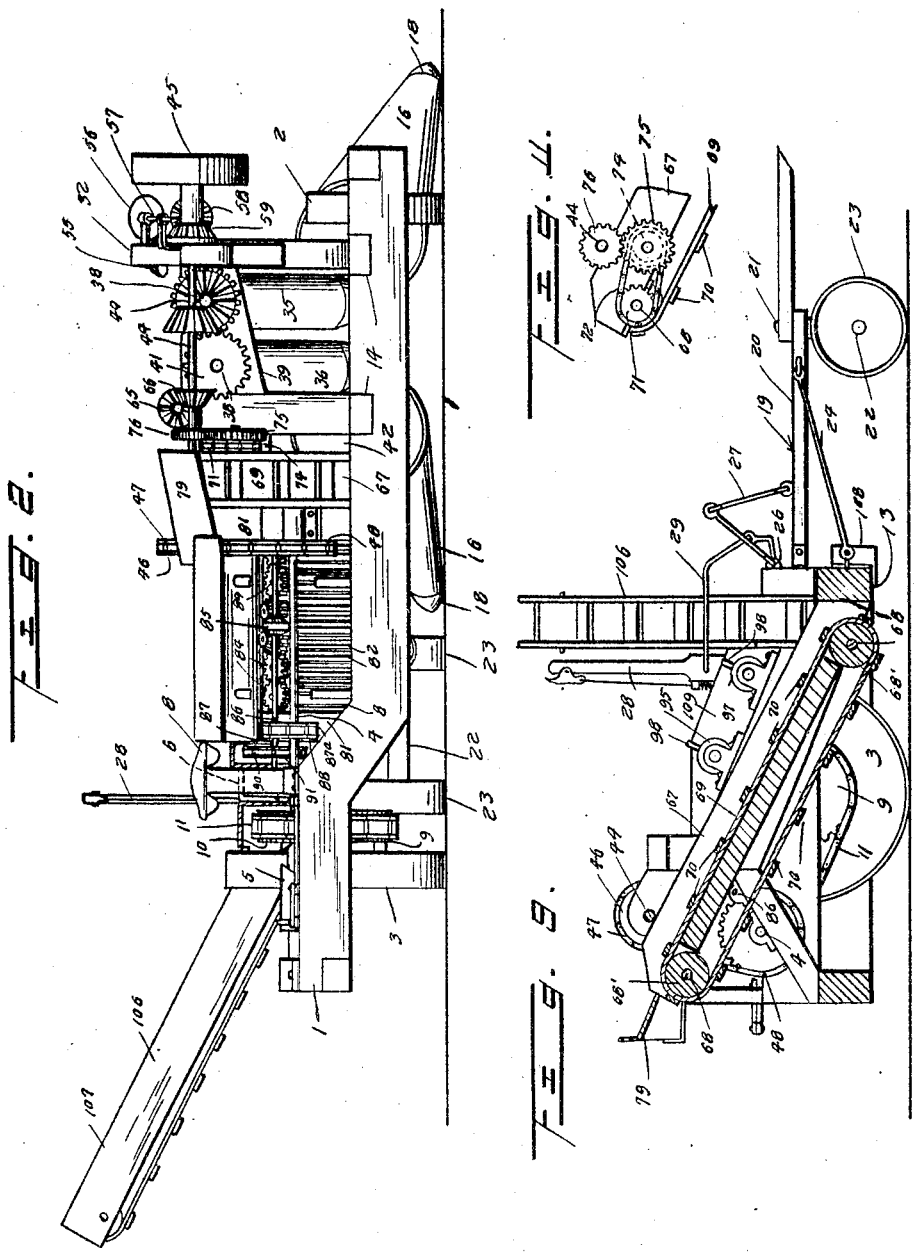

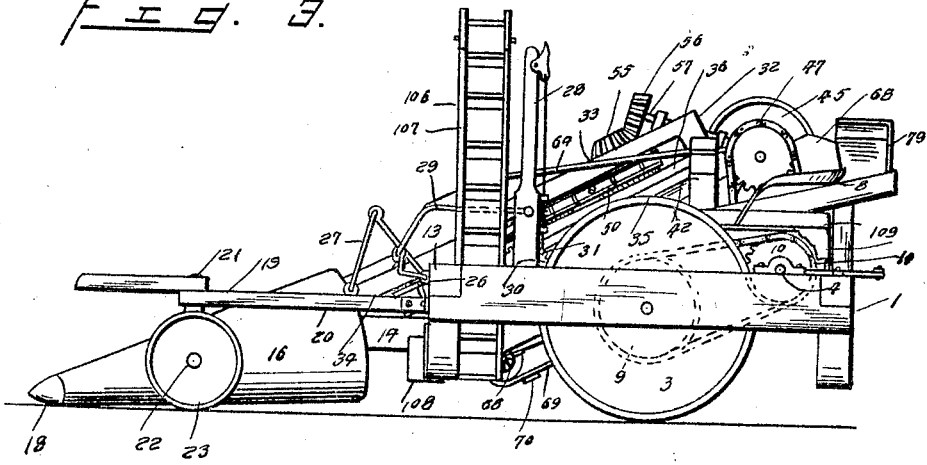

Dec. 8, 1925.
R. L. MORGAN
1,565,189
CORN HARVESTER
Filed Jan. 5, 1922   5 Sheets-Sheet 4
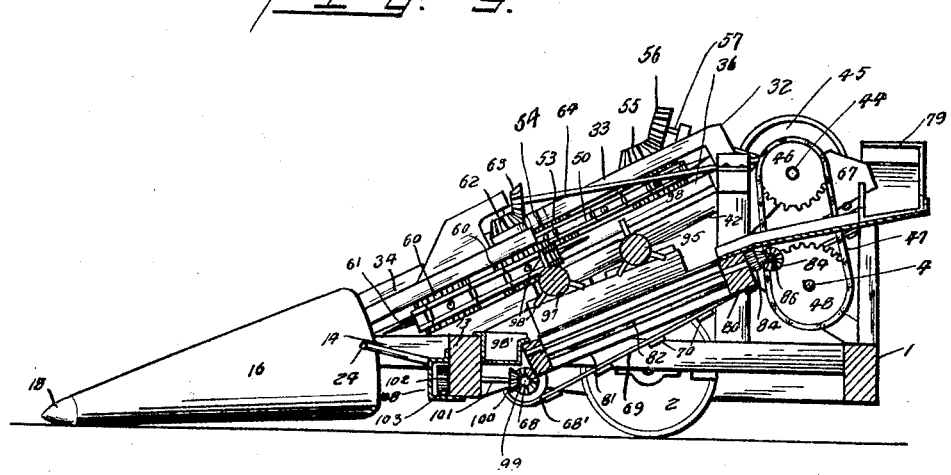
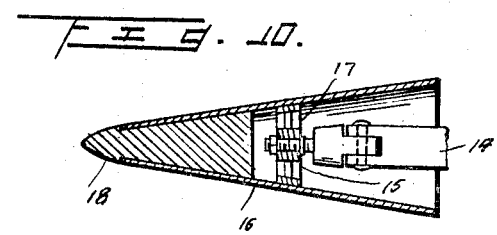
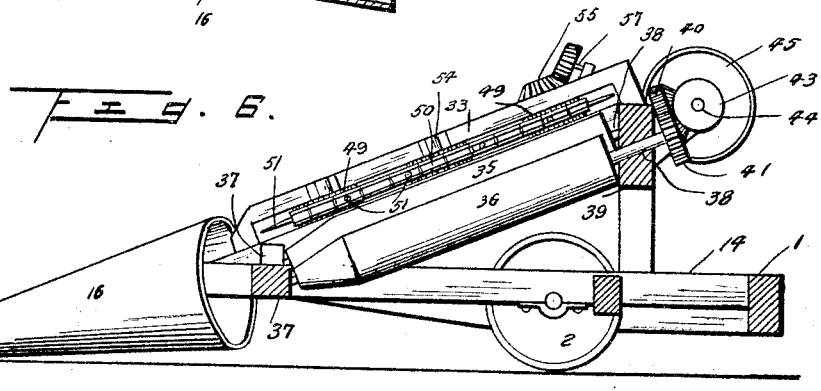

Dec. 8, 1925.  R. L. MORGAN  1,565,189
CORN HARVESTER
Filed Jan. 5, 1922  5 Sheets-Sheet 5
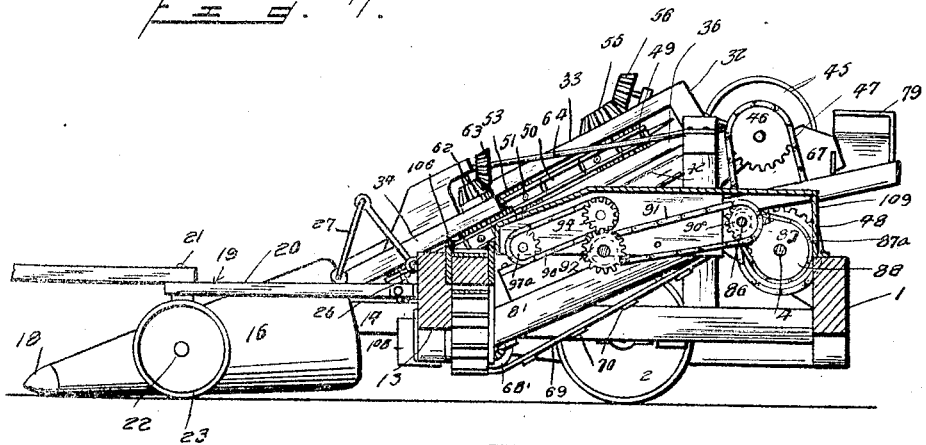
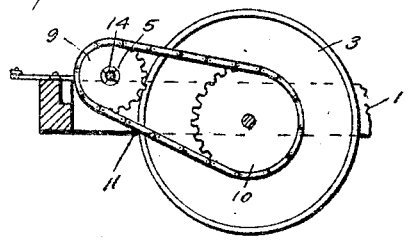
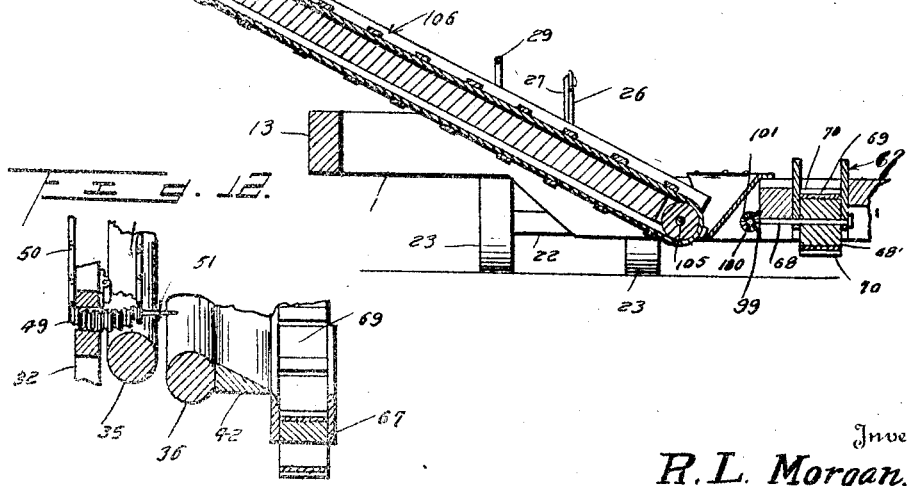
Inventor
R. L. Morgan.
By
Attorney Patented Dec. 8, 1925.

1,565,189

UNITED STATES PATENT OFFICE.

ROBERT L. MORGAN, OF WILLIAMSVILLE, ILLINOIS.

CORN HARVESTER.

Application filed January 5, 1922. Serial No. 527,137.

*To all whom it may concern:*

Be it known that I, ROBERT L. MORGAN, a citizen of the United States, residing at Williamsville, in the county of Sangamon and State of Illinois, have invented certain new and useful Improvements in Corn Harvesters; and I do hereby declare the following to be a full, clear, and exact description of the invention, such as will enable others skilled in the art to which it appertains to make and use the same.

This invention relates to new and useful improvements in corn harvesters and has for its primary object the provision of means for stripping ears of corn from the stalks and for removing the husks from the ears and delivering the latter to one side of the harvester into a vehicle or to permit them to fall upon the ground for collection later if desired.

Another object of this invention is the provision of a corn harvester of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention reference is to be had to the following description and accompanying drawings, in which:—

Figure 1 is a top plan view illustrating a corn harvester constructed in accordance with my invention, Figure 2 is a rear elevation illustrating the same, Figures 3 and 4 are side views illustrating the device, Figure 5 is a detail sectional view, illustrating the husking rollers, the view being taken on the line 5—5 of Figure 1, Figure 6 is a similar view on the line 6—6 of Figure 1 illustrating the snapping rollers, Figure 7 is a sectional view taken on the line 7—7 of Figure 1, Figure 8 is a sectional view taken on the line 8—8 of Figure 1, illustrating the corn delivering conveyor, Figure 9 is a similar view taken on the line 9—9 of Figure 1, Figure 10 is a sectional view, illustrating the mounting of one of the cone elements.

Figure 11 is a detail view illustrating the drive for the conveyor,

Figure 12 is a detail sectional view illustrating the snapping rollers associated with the plate or board and the location of the latter with respect to the conveyor, Figure 13 is a detail sectional view illustrating the drive from the bull wheel.

Referring in detail to the drawings, the numeral 1 indicates a main frame supported adjacent its ends by a ground wheel 2 and a bull or drive wheel 3 and said frame is mounted for vertical adjustment, so that the distance between the ground and the main frame can be varied as desired. A drive shaft 4 is journaled longitudinally of the main frame 1 and in rear of the bull or drive wheel and is provided with a clutch 5 controlled by a foot pedal 6 located upon a transverse beam 7 of the main frame and also located in close proximity to the operator's seat 8 and the latter is mounted on the beam 7. One element of the clutch 5 is formed integrally with a sprocket wheel 9 that is journaled on the drive shaft 4 and said sprocket wheel is connected to a sprocket wheel 10 by an endless chain 11 and the sprocket wheel 10 is secured to the bull or drive wheel 3. The other clutch element of the clutch 5 is splined to the drive shaft and is engaged by a fork 12 and the latter is pivoted to the frame 1 and connected to the foot pedal through a series of links and levers. It is therefore apparent that the operator may establish a driving connection between the bull wheel and the drive shaft when desired.

The front rail 13 of the frame 1 adjacent the ground wheel 2 is cut away and is connected to relatively spaced beams 14 that are secured to the frame 1 and form a corn stalk receiving space and the forward ends of the beams 14 project beyond the rail 13 of the frame 1 and are curved or directed outwardly. The forward ends of the beams 14 have hinged thereto axles 15 on which are journaled cone shaped elements 16 preferably of hollow formation. The elements 16 are provided with webs 17 in the form of wheels that have their peripheries secured to the inner walls of said cone elements 16 and have their hubs journaled on the axles. The axles being hinged to the forward ends of the beams 14 permit the cone elements to move upwardly and downwardly when passing over uneven ground. The cone elements engage the ground and their apexes are closed by pointed elements 18 that facilitate the passing of the cone elements under corn stalks that have fallen onto the ground and the pointed elements form a continuation of the contour of the cone elements 16. The cone elements during the forward movement of the harvester pass under fallen corn stalks and move the stalks in alinement with the passage formed by the beams 14. It is to be understood that the cone elements are arranged on opposite sides of a row of corn when harvesting, and the cone elements being mounted for rotation by contact with the ground will straighten or feed the corn stalks in the proper direction without any liability of detaching the ears of corn from the stalks.

A truck 19 including a beam 20 has one end hinged to the rail 13 of the frame 1 at one side of the cone elements and the beam carries at its forward end a king bolt 21 which connects an axle 22 to the beam and the axle has journaled thereon wheels 23. The king bolt projects above the beam and has connected thereto a draft tongue whereby the device may be coupled to a draft source and steered. A brace 24 is connected to the frame 1 and to the beam 20 adjacent its forward end.

A crank lever 26 is journaled to the frame 1 and is connected to the beam 20 by a link 27 and is also connected to a controlling lever 28 by a rod 29 and the lever 28 is pivoted to the beam 7 and in close proximity to the seat 8 so that the operator may raise and lower the forward portion of the frame as desired.

A rack 30 is associated with the lever and carried by the beam 7 and is engaged by a dog 31 carried by said lever 28 whereby the lever may be locked in various adjusted positions so that the frame 1 along its forward edge may be held at various elevations relative to the ground surface.

An inclined frame 32 is carried by the main frame 1 and the beams 14 and comprises inclined beams 33 and 34 that extend parallel with the beams 14 and receive between the same the stalks of corn. Snapping rollers 35 and 36 are arranged on an incline and between the beams 33 and 34 and have their forward ends beveled and journaled in bearings 37 carried by the forward ends of the beams 14. The other ends of the snapping rollers 35 and 36 are reduced to form spindles 38 that are journaled in bearings 39 carried by the frame 32 and have secured to their ends gears 40 and 41 and which gears mesh with each other to cause the snapping rollers to rotate in opposite directions. The snapping rollers are slightly spaced and the snapping roller 35 is located in a plane slightly above the snapping roller 36 so that when the ears are snapped from the stalks passing between the snapping rollers they fall onto an inclined plate or board 42 supported by the beam 34. The beam 34 is cut away or terminates short of the upper end of the frame 32 so as to form a seat for the plate or board 42 and to permit the ears of corn to pass from the snapping rollers onto said plate or board. The gear 40 is of a double type that is provided with a series of bevel teeth and with a series of radial teeth that mesh with the teeth of the gear 41 while the series of bevel teeth mesh with a bevel gear 43 secured to a shaft 44 journaled to the auxiliary frame and which carries at one end a fly wheel 45 and at its other end a sprocket wheel 46 over which is trained an endless chain 47 and the latter is trained over a sprocket wheel 48 secured to the drive shaft 4; thus it will be seen that the snapping rollers are driven from the drive shaft. The beam 33 has journaled thereto sprocket wheels 49 over which is trained a feed chain 50. The feed chain is provided with teeth 51 for the purpose of catching the stalks of corn as they approach the forward ends of the snapping rollers and feed said stalks of corn rearwardly between the snapping rollers. An idle wheel 53 is adjustably mounted on the beam 33 by a bracket 54 and engages one run of the feed chain 50 for the purpose of positioning said run of the feed chain properly over the snapping roller 35 to bring the teeth of the respective chains into contact with the stalks of corn. The shaft on which the uppermost sprocket wheel 49 is secured has secured to its uppermost end a bevel gear 55 engaged by a bevel gear 56 secured to a shaft 57. The shaft 57 is journaled in suitable bearings carried by the beam 33 and the frame 32 and is provided with a bevel gear 58 that meshes with a bevel gear 59 secured to the shaft 44 for the purpose of imparting rotation to the feed chain. Sprocket wheels 60 are journaled to the beam 34 and are arranged in closer relation than the sprocket wheels 49 and has a feed chain 61 trained thereover and is of a shorter length than the feed chain 50 but of a similar construction having teeth and is adapted to coöperate with the feed chain 50 in feeding the stalks of corn between the snapping rollers. The shaft to which one of the sprocket wheels 60 is secured is provided with a bevel gear 62 that engages a bevel gear 63 secured to one end of a shaft 64. The other end of the shaft 64 is provided with a bevel gear 65 which meshes with a bevel gear 66 (Figure 2) secured to the shaft 44 for the purpose of rotating the feed belt or chain 61.

The shaft 64 is journaled in bearings carried by the frame 32 and the beam 33, and the shaft is spaced a sufficient distance above the table or board 42 to permit the ears of corn to readily pass between said shaft and the table.

A conveyor trough 67 is carried by the main frame and in close proximity to the table 42 and inclined upwardly and rearwardly and is in a plane below the highest edge of the inclined table 42 and is adapted to receive from the table the ears of corn. Shafts 68 are located at the ends of the trough 67 and are provided with sprocket wheels 68' over which an endless conveyor 69 is trained and the latter is provided with suitable flights 70 for the purpose of causing the corn to travel upwardly in the trough 67. One of the shafts 68 is provided with a sprocket wheel 71 over which a sprocket chain 72 is trained and the latter is trained over a sprocket wheel 74 journaled to one of the sides of the conveyor trough. Said sprocket wheel 74 is formed integrally with a gear 75 that meshes with a gear 76 secured to the shaft 44. The conveyor trough 67 is provided with a bottom wall for the purpose of enclosing and protecting the upper run of the conveyor belt. The ears of corn are elevated by the conveyor belt and deposited in a trough 79 which inclines in the direction of a distributing table 80 and deposits the ears of corn onto said table and the latter is disposed on an incline and is supported by a frame 81 secured to the main frame 1. The frame 81 has journaled thereto pairs of husking rollers 82 that are disposed on an incline and receives the ears of corn from the table 80 and are each provided with longitudinally extending grooves to facilitate the husking of the corn or the removing of the husks from the ears of corn. The husking rollers are connected at their upper ends by gears 84 and a pair of said gears are provided with bevel teeth to engage a double bevel gear 85 secured to a shaft 86 and the latter is journaled to the frame 81. The shaft 86 is equipped with a sprocket wheel 87 engaged by a sprocket chain 87ᵃ and the latter is trained over a sprocket wheel 88 secured to the drive shaft 4. The shaft carrying the double bevel gear is also provided with a sprocket wheel 90 engaged by a sprocket chain 91 and the latter engages a combined sprocket wheel and gear 92 journaled to the beam 7. The gear 92 meshes with a combined sprocket wheel and gear 94 secured to one end of a retarding roller 95. The last named combined sprocket wheel and gear is equipped with a sprocket chain 96 that is trained over a sprocket wheel 97ᵃ secured to one end of a retarding roller 97. The retarding rollers 95 and 97 are journaled over the husking rollers and extend at right angles to said husking rollers and are provided with tines 98 for the purpose of feeding the ears of corn off of the husking rollers into a hopper 98' located at the forward ends of said husking rollers upon the main frame 1. One of the shafts of the ear conveyor is provided with a bevel gear 99 that meshes with a bevel gear 100 secured to a shaft 101 journaled to the rail 13 of the main frame and has secured thereto a sprocket wheel 102 over which a sprocket chain 103 is trained. The sprocket chain 103 is in turn trained over a sprocket wheel 104 secured to a shaft 105 at one end of an ear delivery conveyor 106. The conveyor 106 is arranged on an incline and it is adapted to discharge ears to one side of the harvester and may be caught by a vehicle or wagon traveling at said side of the harvester. The conveyor 106 receives the ears of corn after being husked from the hopper and carriers them upwardly and discharges them into the vehicle mentioned. The conveyor 106 includes a trough 107 with sprocket wheels to receive a conveyor belt provided with suitable flights and one of the sprocket wheels is secured to the shaft 105 so that the conveyor will be driven from the shaft 68. The sprocket chains and sprocket wheels located on the rail 13 of the main frame are enclosed by a housing 108 and also the sprocket chains and wheels located adjacent to the driver or operator are enclosed in housings 109.

In operation, the device is drawn forward by a suitable power source with the cone shaped elements straddling a row of corn stalks which are gathered by said elements and fed rearwardly by the feed belts and engaged by the snapping rollers that are disposed on an inclined plane for the purpose of stripping from the stalks the ears of corn. The ears of corn fall onto the table 42 and onto the corn elevating conveyor and are conveyed to the trough and slide therefrom onto the distributing table 80. The ears of corn gravitate onto the husking rollers from the distributing table and the husks are removed from the ears of corn and dispensed with under the husking rollers or main frame while the ears of corn fall into the hopper and are caught by the conveyor 106 and delivered to the wagon or vehicle traveling at one side of the harvester.

While I have shown and described the preferred embodiment of my invention, it will be understood that minor changes in construction, combination, and arrangement of parts may be made without departing from the spirit and scope of the invention as claimed.

Having thus described my invention what is claimed is:—

1. A corn harvester including an operating means to direct corn stalks into the harvester, inclined snapping rollers for the corn ears, one of said snapping rollers disposed in a plane slightly above the other snapping roller, feed belts carried by the frame and positioned above and associated with the snapping rollers to cause the corn stalks to move rearwardly between the snapping rollers, the feed belt above the lowermost snapping roller being shorter than the other feed belt whereby to permit ears of corn stripped from the corn stalks to fall laterally of the snapping rollers, a table arranged at one side of the lowermost snapping roller and inclining laterally therefrom, an elevating conveyor arranged to receive ears of corn from said table and elevate and deliver them to a distributing table at the rear of the wheel frame, said distributing table inclining toward the front of the frame, husking rollers inclining downwardly from the lower edge of said distributing table, retarding means extending transversely of the husking rollers and arranged above the same, and a conveyor arranged at the front of the wheel frame and adapted to receive the ears from the husking rollers and deliver the same at one side of the machine.

2. A corn harvester having separated beams, hollow gathering members into which said beams extend, axles carried at the forward end of said beams and on which said members are journaled, and means pivotally connecting the axles to the beams and on axes at a right angle to the axles.

3. A harvester having spaced beams, said beams at their forward ends extending away from each other, gathering members of substantially conical form, said members being hollow, said beams extending into said members through the larger ends thereof, and axle connections within said members and between said members and the forward ends of said beams.

4. A harvester having spaced beams, said beams at their forward ends extending away from each other, gathering members of substantially conical form, said members being hollow, said beams extending into said members through the larger ends thereof, axle connections within said members and between said members and the forward ends of said beams, snapping rollers in the rear of said beams, and feed elements for the stalks associated with said snapping rollers, one of said elements terminating short of the rear end of the rollers to provide a lateral discharge passage over the last mentioned roller.

In testimony whereof I affix my signature.

ROBERT L. MORGAN.